(12) United States Patent
Jacobowitz et al.

(10) Patent No.: US 8,913,856 B2
(45) Date of Patent: Dec. 16, 2014

(54) MANUFACTURABLE OPTICAL CONNECTION ASSEMBLIES

(75) Inventors: Lawrence Jacobowitz, Wappingers Falls, NY (US); John U. Knickerbocker, Wappingers Falls, NY (US); Ronald P. Luijten, Horgen (CH); Subhash L. Shinde, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/880,289

(22) Filed: Jun. 29, 2004

(65) Prior Publication Data

US 2004/0240774 A1  Dec. 2, 2004

Related U.S. Application Data

(62) Division of application No. 10/254,955, filed on Sep. 25, 2002, now Pat. No. 6,793,407.

(51) Int. Cl.
*G02B 6/12* (2006.01)
*G02B 6/32* (2006.01)
*G02B 6/43* (2006.01)
*G02B 6/42* (2006.01)

(52) U.S. Cl.
CPC ........... *G02B 6/43* (2013.01); *G02B 6/4228* (2013.01); *G02B 6/4249* (2013.01)
USPC .............................................. 385/14; 385/33

(58) Field of Classification Search
USPC ..................................... 385/88–94
See application file for complete search history.

(56) References Cited

U.S. PATENT DOCUMENTS

| | | | | |
|---|---|---|---|---|
| 3,663,194 A | * | 5/1972 | Greenstein et al. | 65/43 |
| 4,070,516 A | * | 1/1978 | Kaiser | 428/137 |
| 5,500,540 A | | 3/1996 | Jewell et al. | |
| 5,619,359 A | | 4/1997 | Redmond et al. | |
| 5,923,796 A | * | 7/1999 | Feldman et al. | 385/14 |
| 6,097,857 A | * | 8/2000 | Feldman | 385/14 |
| 6,477,290 B1 | * | 11/2002 | Wan et al. | 385/17 |
| 6,661,943 B2 | * | 12/2003 | Li | 385/18 |

(Continued)

FOREIGN PATENT DOCUMENTS

| | | |
|---|---|---|
| JP | 9043459 A | 2/1997 |
| JP | 10126002 A | 5/1998 |

(Continued)

OTHER PUBLICATIONS

International Application No. PCT/EP2003/050388 Filed: Aug. 28, 2003 Inventor: Jawrence Jacobowitz, et al. PCT International Search Report.

*Primary Examiner* — Michelle R Connelly
(74) *Attorney, Agent, or Firm* — Ira D. Blecker; Wenjie Li; Steven J. Meyers

(57) ABSTRACT

A set of interlocking modules supports and connects a die containing lasers, a set of precision molded lenses and a set of beam switching elements. Another embodiment of the invention is a structure for mounting a logic chip and an optical chip on a chip carrier, with the optical chip being mounted on the side of the carrier facing the system board on which the carrier is mounted, so that radiation travels in a straight path from optical sources on the optical chip into optical transmission guides on the board.

16 Claims, 2 Drawing Sheets

(56) References Cited

U.S. PATENT DOCUMENTS

| | | |
|---|---|---|
| 6,793,407 B2 | 9/2004 | Jacobowitz et al. |
| 7,049,704 B2 * | 5/2006 | Chakravorty et al. ........ 257/778 |
| 7,271,461 B2 * | 9/2007 | Dutta ............................ 257/432 |
| 7,418,163 B2 * | 8/2008 | Chakravorty et al. .......... 385/14 |
| 2002/0018635 A1 | 2/2002 | Hsieh et al. |
| 2002/0039464 A1 * | 4/2002 | Yoshimura et al. ............. 385/14 |
| 2002/0067882 A1 | 6/2002 | Guilfoyle |
| 2002/0105699 A1 | 8/2002 | Miracky et al. |
| 2003/0142913 A1 * | 7/2003 | Li ................................... 385/47 |

FOREIGN PATENT DOCUMENTS

| | | |
|---|---|---|
| JP | 2001083373 A | 3/2001 |
| JP | 2001116962 A | 4/2001 |
| WO | WO0186337 A1 | 11/2001 |
| WO | WO2004029684 A1 | 4/2004 |

\* cited by examiner

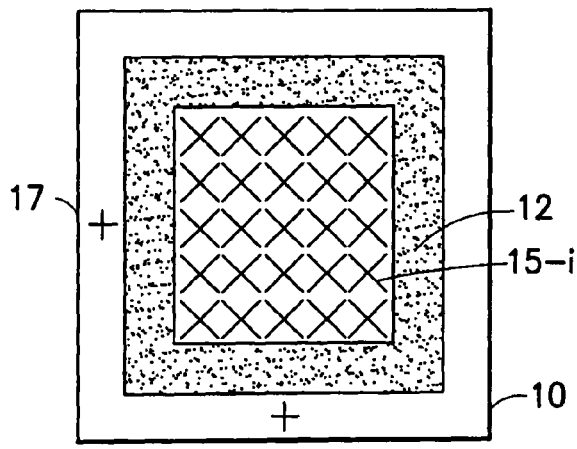
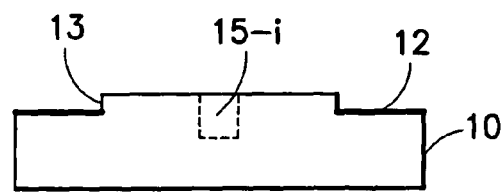
FIG.1A
FIG.1B
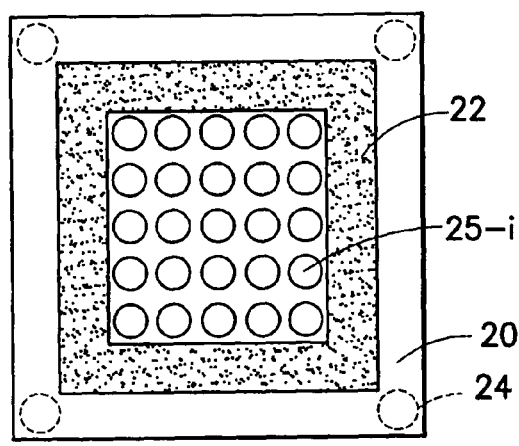
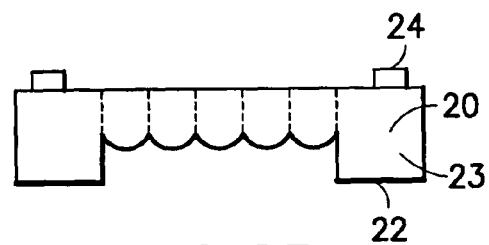
FIG.2A
FIG.2B

MANUFACTURABLE OPTICAL CONNECTION ASSEMBLIES

RELATED APPLICATION

This is a divisional of patent application Ser. No. 10/254,955, filed Sep. 25, 2002, now U.S. Pat. No. 6,793,407, which is hereby incorporated by reference in its entirety.

TECHNICAL FIELD

The field of the invention is that of assembling optical sources such as VCSEL arrays to substrates containing transmissions links and optical routing members.

BACKGROUND OF THE INVENTION

As high volume digital systems expand their use of optical interconnects, the need for a manufacturable optical connection system increases.

High volume systems typically have a backplane connecting a number of system boards. Such systems contain arrays of optical sources such as VCSELs that generate light that is modulated to carry data and directed to various locations where detectors such as photodiodes convert the modulated optical radiation to electronic signals that can be processed in conventional digital processing systems.

A recurring problem in the field is that of misalignment in optical connector systems. Signal loss that increases the noise level or renders the signal undetectable occurs frequently. Precision alignment systems require expensive setup and constant maintenance.

The art would benefit from passive alignment systems employing self-aligning structures fabricated at low cost with lithographic precision.

SUMMARY OF THE INVENTION

The invention relates to an alignment system for assembling an array of optical sources in alignment with a set of optical transmission members on a system board.

A feature of the invention is the fabrication on the optical chip containing an array of optical sources of passive alignment features.

A feature of the invention is the provision of a simple unit containing an array of lenses in alignment with the array of sources and positioned with alignment members interlocking with the passive alignment features on the optical chip.

Another feature of the invention is the provision of a replaceable optical switching structure fitting into a receptacle matched to the array of lenses, for receiving radiation from the VCSEL array and directing it to various locations on the system board.

Another feature of the invention is a structure for mounting a logic chip and an optical chip on a chip carrier, with the optical chip being mounted on the side of the carrier facing the system board on which the carrier is mounted, so that radiation travels in a straight path from optical sources on the optical chip into optical transmission guides on the board.

BRIEF DESCRIPTION OF THE DRAWINGS

FIGS. 1A through 3B show layers in a first embodiment of the invention in plan and side views.

DETAILED DESCRIPTION

Figure 3A:
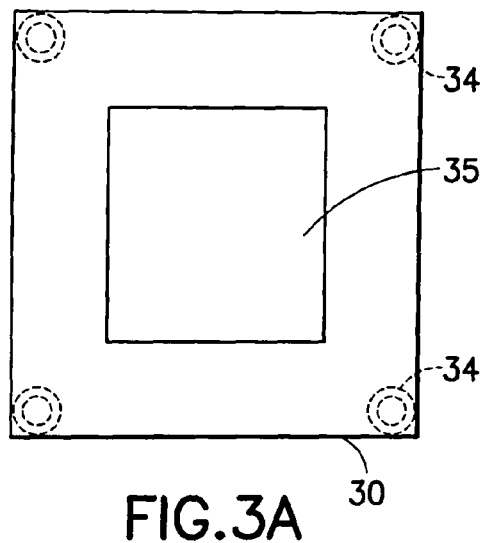

FIGS. 1 to 3 show in plan view and side view a three-layer module that assembles a VCSEL array, a corresponding array of lenses and another corresponding array of optical manipulators that modulate or switch the radiation. In FIGS 1A and 1B, M×N VCSEL array 15-$i$ on die 10 generates optical radiation. A band 12 surrounding the array is illustratively composed of metallic thin film on which Sn—Pb solder preform can be applied. Fiducial marks 17 are shown as an example. Marks 17 are used to align the die in a precision stage under visual observation. Other marks may be used for self-alignment. This is shown in side view in FIG. 1B. For example, the die 10 is made of GaAs and has conventional VCSELs formed in it. Conventional electrical leads going to the VCSELs are omitted from the drawing for simplicity.

FIGS. 2A and 2B show the next layer is the assembly, referred to generally as an optical transfer unit, in which a lens array 25-$i$, referred to as optical transfer means, is aligned with the VCSEL array. Illustratively the material of optical unit 20 is polymer or glass, transparent to the radiation from the laser array and able to withstand the temperature of 240 degrees C. at which solder 12 is reflowed. It is molded with conventional precision techniques based on a model that is formed by semiconductor lithographic techniques. For example, the individual lenses in the array may be formed as Fresnel lenses and the projecting rim 23 on the sides in FIG. 2B is etched from silicon as a mold material. With the use of semiconductor etching and forming techniques, definition and placement of the optical lenses can readily be achieved to a tolerance of 10 microns, well within the requirements of the optical system.

Strip 22 in FIG. 2A is also formed of solder electroplated on the bottom of rim 23. On the top surface of module 20 in FIG. 2B, studs 24 (passive alignment structures) are formed by lithographic techniques and then molded. Alternatively, the studs could be etched into the material of module 20 after it is molded, aligned to fiducial marks placed in the mold when it is first made.

Illustratively, alignment between die 10 and module 20 is provided by rim 23 (defining a second dimension) fitting vertical edge 13 of a step that is etched into the top of die 10, thus defining a first dimension. Thus, the outer rim of die 10 is recessed, illustratively 10 cm, and rim 23 of module 20 surrounds the projecting center of the die, positioning the lenses with respect to the VCSEL array transversely and, since the etching of the step in die 10 and the formation of the rim in the mold for module 20 are done with high mechanical precision, the vertical distance is also set within specifications of about 50 microns. This passive self-alignment system has the advantage that pieces 10 and 20 fit together. Because of the very precise tolerances required in this application and the different coefficients of thermal expansion of the pieces being bonded, assembly is preferably done at an assembly temperature of less than 230 degrees C. so that any stresses between the pieces at room temperature are within acceptable limits.

Figure 3B:
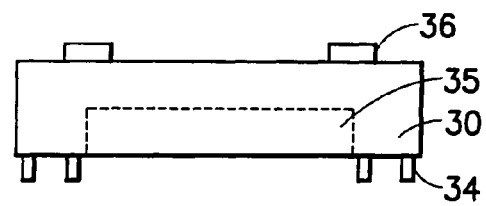

The focal length of the lenses is set such that radiation is coupled into receiving sections 25 on optical transfer member 35 of FIGS. 3A and 3B. This top unit in the stack has the function of coupling radiation emerging from lenses 25-$i$ into a set of waveguides, Bragg reflectors, mirrors and other optical manipulators in member 35. The function of member 35 is to process the radiation; e.g. to modulate it with a data bitstream. Member 35 is shown schematically as a rectangle in this figure. The radiation is then coupled from member 35 into conventional waveguides, not shown in this figure, in a system board.

Shell 30 in FIG. 3 is pluggable, meaning that it can be inserted and removed by hand, for ready replacement. The individual pieces can be removed so as to provide flexibility in the design. Unit 30 is adapted for interconnection to a fiber array, or a optical routing element etc.

Box 35 can be a passive optical router, such as gratings, lenses etc. It could also have liquid crystal valve arrays in an alternative embodiment, In contrast to the removable nature of connector 30, module 20 is bonded to die 10 by solder reflow. The solder can be remelted, but the design assumption is that this is a one-time bond. Referring again to connector 30, mounting structures 34 mate with corresponding structures 24 on module 20. For example, plugs 24 are circular in cross section (they could alternatively be, e.g. 1 mm square) and mating sockets 34 have circular cavities that fit plugs 24 with a very low tolerance. The assembly, once made, could be kept together by epoxies or solder. The interface between units 20 and 30 is also made at a defined temperature, since the spacing between studs 24 and receptacles 34 will match at only one temperature.

Figure 4:
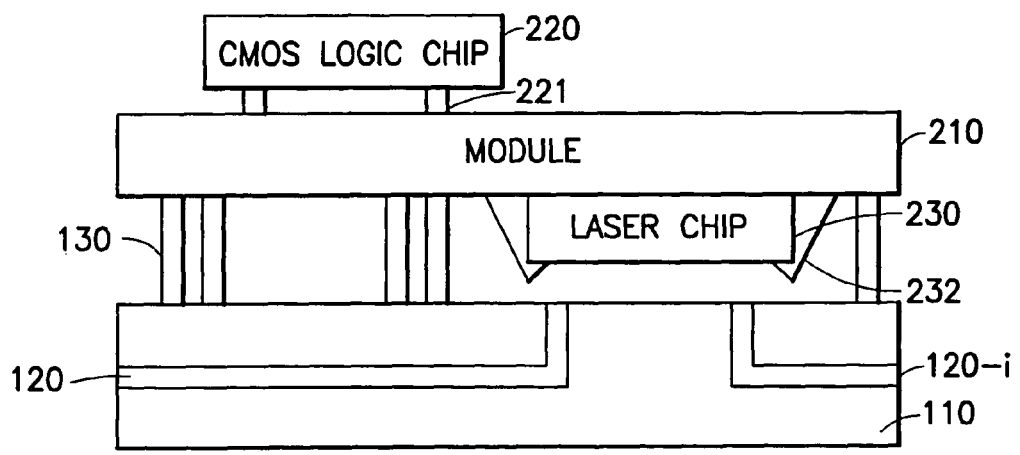
FIG. 4 shows in partially pictorial, partially schematic form a second embodiment of the invention.

Referring now to FIG. 4, there is shown in cross section another embodiment of the invention in which board 110 represents a printed circuit board in a digital system or any other support for an assemblage of electronic chips. Board 110 contains optical waveguides 120-1 and 120-2, as well as the usual electrical interconnections between chips. At the top of the Figure, chip 220 represents a number of electronic chips that process data, coupling signals and power through a set of contacts 221. Chip 220 is bonded to a ceramic chip carrier 210, or any other packaging unit, that contains electrical interconnects molded into it. On the side of carrier 210 facing toward the system board 120, an optical chip 230, connected electrically by wire bond leads 232, emits radiation into waveguides 120-1 and 120-2. Alternatively, chip 230 could be attached to carrier 210 using the "flip-chip" method of solder balls that provide both electrical and mechanical connection. The radiation transfer could also be two-way, with photodetectors on chip 230 receiving optical radiation from board 110.

Advantageously, the optical chip 230 contains an array of VCSELs similar to that of chip 10 in FIG. 1, with the radiation being directed at a right angle to the plane of the chip. In this embodiment, the radiation passes through an air gap between chip 230 and waveguides 120. Those skilled in the art will be aware that lenses mirrors, etc. as shown in FIG. 1 may be placed between the laser and the waveguide to facilitate coupling.

The direct transmission between source and waveguide in this embodiment facilitates assembly and replacement of the VCSEL array if required. A seal such as reflow 22 in FIG. 1A can be used, if desired.

In both embodiments, the fragility of VCSEL arrays can be addressed by fabricating strengthening members using semiconductor techniques from the "back end" e.g. depositing a layer of material on the back side of the chip and etching it to form strengthening members that resist mechanical stresses that would crack the die.

While the invention has been described in terms of a single preferred embodiment, those skilled in the art will recognize that the invention can be practiced in various versions within the spirit and scope of the following claims.

What is claimed is:

1. An assemblage structure of components for supporting at least one optical chip and at least one electronic chip and connecting said chips to a system support comprising:

a chip carrier having electrical interconnection disposed thereon and having a lower side facing said system support and an upper side facing opposite said system support;

at least one optical chip mounted on said lower side and having at least one radiation emitting component emitting radiation perpendicular to said optical chip and traveling toward said system support;

at least one electronic chip that processes data mounted on said upper side;

in which said optical chip is mounted aligned with at least one optical transmission medium disposed on said system support, whereby radiation emitted by said at least one radiation emitting component travels along a direct path between said optical chip and said transmission medium;

wherein said system support lies within a plane parallel to the chip carrier and wherein said optical transmission medium is a solid waveguide wholly within said plane of the system support; and further comprising at least one optical transfer unit aligned between said at least one optical chip and comprising lenses that focus radiation emitted by said at least one optical chip on to said optical transmission medium, wherein a rim of the optical transfer unit fits to a vertical edge of a step of the optical chip to align the lenses with the optical chip.

2. An assembly structure according to claim 1, in which said at least one optical chip and said optical transfer unit have been bonded together.

3. An assembly structure according to claim 1, in which said at least one optical chip and said optical transfer unit have been bonded together.

4. An assembly structure according to claim 1 wherein said at least one optical chip is directly mounted only on said chip carrier and only on said lower side.

5. An assembly structure according to claim 1 wherein said at least one optical chip is directly electrically connected only to said chip carrier.

6. An assembly structure according to claim 1 wherein said at least one optical chip comprises an array of VCSELs.

7. An assembly structure according to claim 1 wherein said chip carrier having signal connections in contact with signal connections of said at least one electronic chip.

8. An assembly structure according to claim 1 in which said chip carrier having power connections and signal connections and said at least one electronic chip having power connections and signal connections such that said at least one electronic chip power connections and signal connections being in direct contact only with said chip carrier power connections and signal connections.

9. An assembly structure of components for supporting at least one optical chip and at least one electronic chip and connecting said chips to a system support comprising:

a system support wherein said system support lies within a plane;

a chip carrier having electrical connections disposed thereon and having a lower side facing said system support and an upper side facing opposite said system support;

at least one optical chip directly mounted only on said chip carrier and only on said lower side and having at least one radiation emitting component emitting radiation perpendicular to said optical chip and traveling toward said system support;

at least one electronic chip that processes data mounted on said upper side;

at least one solid waveguide within the plane of the system support, wherein said optical chip is aligned with the at least one solid waveguide, so that radiation emitted by said at least one radiation emitting component travels along a direct path between said optical chip and said at least one solid waveguide and wherein said system support lies within a plane parallel to the chip carrier and wherein said at least one solid waveguide is wholly within the plane of the system support;

further comprising at least one optical transfer unit aligned between said at least one optical chip and comprising lenses that focus radiation emitted by said at least one optical chip on to said optical transmission medium, wherein a rim of the optical transfer unit fits to a vertical edge of a step of the optical chip to align the lenses with the optical chip.

10. An assembly structure according to claim 9 wherein said at least one optical chip is directly electrically connected only to said chip carrier.

11. An assembly structure according to claim 9 wherein said at least one optical chip comprises an array of VCSELs.

12. An assembly structure according to claim 9 in which said chip carrier having power connections and signal connections and said at least one electronic chip having power connections and signal connections such that said at least one electronic chip power connections and signal connections being in direct contact only with said chip carrier power connections and signal connections.

13. An assembly structure of components for supporting at least one optical chip and at least one electronic chip and connecting said chips to a system support comprising:

a system support wherein said system support lies within a plane;

a chip carrier having power connections and signal connections disposed thereon and having a lower side facing said system support and an upper side facing opposite said system support;

at least one optical chip mounted only on said chip carrier and only on said lower side and having a plurality of radiation emitting components emitting radiation perpendicular to said optical chip and traveling toward said system support;

at least one electronic chip that processes data mounted on said upper side, said at least one electronic chip having power and signal connections in contact with the power and signal connections of said chip carrier;

a plurality of solid waveguides within the plane of the system support, wherein said optical chip is aligned with the plurality of solid waveguides, so that radiation emitted by said plurality of radiation emitting components travels along a direct path between said optical chip and said plurality of solid waveguides; and further comprising at least one optical transfer unit aligned between said at least one optical chip and comprising lenses that focus radiation emitted by said at least one optical chip on to said optical transmission medium, wherein a rim of the optical transfer unit fits to a vertical edge of a step of the optical chip to align the lenses with the optical chip.

14. An assembly structure according to claim 13 wherein said system support lies within a plane parallel to the chip carrier and wherein said plurality of waveguides are wholly within the plane of the system support.

15. An assembly structure according to claim 13 wherein said at least one optical chip is directly electrically connected only to said chip carrier.

16. An assembly structure according to claim 13 wherein said at least one optical chip comprises an array of VCSELs.

\* \* \* \* \*